United States Patent Office 3,058,804
Patented Oct. 16, 1962

3,058,804
PROCESS FOR PRODUCTION OF DEFLUORINATED CALCIUM PHOSPHATE
Donald E. Tynan, Lakeland, Fla., assignor to International Minerals & Chemical Corporation, a corporation of New York
No Drawing. Filed May 24, 1957, Ser. No. 661,278
2 Claims. (Cl. 23—109)

This invention relates to the defluorination of natural phosphate materials. More particularly, it relates to the manufacture of defluorinated phosphates useful as animal feed or animal feed supplement providing both needed phosphorus and calcium. Still more particularly, it relates to the manufacture of defluorinated tricalcium phosphate.

Mineral phosphates of all the natural deposits in the United States and in most foreign countries occur in the form of apatite containing too much fluorine to permit their use as feed material without processing to reduce the content of objectionable fluorine from an original approximately 3.0 to about 3.8% to below about 0.13% in a phosphate feed containing about 30% $P_2O_5$.

This fluorine content of the natural phosphate rocks has, in the past, been reduced by mixing the rock with additives such as sulfuric acid, phosphoric acid, silica and the like, and calcining the mixtures to drive off the fluorine.

Among the patents teaching calcination is Butt, #2,442,969. In this patent, phosphate rock is mixed with phosphoric acid and calcined to defluorinate. The calcined product, while very low in fluorine content, has a very low citrate solubility.

Another patent, Tromel, #2,093,176, prepares mixes of phosphate rock with sulfuric acid, etc., and silicic acid which are calcined and fused. These mixtures are low in phosphorus content and like Butt's products, have low citrate solubility.

In still another patent, Ritter, #2,337,498, mixes are prepared by adding only an amount of phosphoric acid sufficient to convert free lime to tricalcium phosphate, and 0.5 mole of alkali for each mole of $P_2O_5$ and calcined. This mixture is calcined at temperatures of 1100° to 1400° C. This product is low in phosphorus content, i.e., about 15.5 to 16.5% P, and requires uneconomically large amounts of soda ash to produce products of less than 0.1% fluorine.

It is a primary object of this invention to overcome the shortcomings and disadvantages of processes heretofore in use.

It is an object of this invention to provide a process which, with relatively small additions of soda ash, gives a product meeting the industry's requirements for a product of less than 0.1% F in products of at least 30% $P_2O_5$, and high ammonium citrate solubility.

It is another object of this invention to provide a method of defluorinating calcium phosphates wherein the defluorination is accomplished in two stages, the first stage being under calcining conditions which do not require the extreme operating care necessary in previous processes and a second stage which completes defluorination and converts the $P_2O_5$ into tricalcium orthophosphate form desirable for animal feed supplements.

It is a further object of this invention to provide a process involving the addition of phosphoric acid and alkali metal salts to phosphate rock in a manner which produces mixtures giving lower fluorine content upon calcining or defluorinating to the same degree as other mixtures in a shorter heat treatment period.

It is a still further object of the invention to provide a process wherein acid reacting sodium phosphate salts are utilized as addition agents.

It is a still further object of the invention to provide a process wherein the phosphates are converted to substantially 100% citrate soluble $P_2O_5$. These and other objects will be apparent to those skilled in the art from the following description.

Now it has been discovered that completeness and ease of fluorine removal is markedly changed by the order of introduction of additives preparatory to calcining the mixtures.

Briefly, the invention comprises admixing acid reacting sodium phosphate salt with phosphate rock to form a wetted thoroughly mixed blend of mixed solids in proportions such that in the calcined product the mole ratio represented by the following formula is between 2.8 and 3.8.

$$\frac{\text{Moles}}{\text{Moles}} = \frac{CaO + MgO + Na_2O + K_2O - SO_3 - F_2}{P_2O_5 - Fe_2O_3 - Al_2O_3}$$

where the amounts of the substances are expressed in moles (computed in each instance by dividing the total weight of each substance by its molecular weight). Acidic constituents such as $SO_3$ and $F_2$ are subtracted from the moles of CaO and other alkaline constituents as indicated by minus signs, and calcining the mixture at temperatures higher than about 1250° C.

In a preferred form of the invention, phosphoric acid and volatile anion salts of alkali metals are mixed and reacted in proportions producing a mole ratio of alkali metal to phosphate ion in the reaction product of between about 1:1 and about 2:1. This acid reacting alkali metal phosphate product is then mixed with phosphate rock in proportions to give a mole ratio in the above described range.

Phosphate rock may be preliminarily wetted with water and the sodium acid phosphates added dry or an aqueous solution prepared as above described added to the wetted or dried phosphate rock, the moisture content of the final mix being generally between 5% and 15% by weight of the mix. Intimate mixing of these materials may be accomplished in suitable apparatus such as a pug mill, clay mill, and the like, which will handle high solids content masses. It is preferred that this mixing or blending be carried out over a period of about 3 to 10 minutes.

Addition of acid reacting alkali metal salts must be in quantities such as to give an alkali metal oxide to $P_2O_5$ mole ratio in the range between about 0.2:1 and about 0.6:1 or somewhat higher, excellent results having been obtained at 0.77:1, as demonstrated in the operating examples below, since quantities in this range have a marked effect upon the defluorination of mixtures and upon the citrate solubility of the products. For mixtures of the same calculated mole ratio of ingredients, calcined with the same water vapor content gases in contact with the solids, increase in alkali metal salt content reduces the fluorine content of the calcined product as much as 10 to 15 fold. Addition of alkali metal salts is most effective when calcining the more difficult to defluorinate mixtures, i.e., those with a higher calculated mole ratio. Addition of sufficient alkali metal salt to give an alkali metal oxide to $P_2O_5$ mole ratio in the above range, improves the defluorination and the P/F weight ratio of the product of the calcining operation which may be one or more stages. For a mixture having a mole ratio of 3.5, calculated according to the above formula, increasing the $Na_2O$ to $P_2O_5$ mole ratio from substantially 0 to 0.27:1 improves the P/F from approximately 15 to approximately 190 when 10% water vapor is present in the gaseous medium contacting the solids during calcining.

With rock containing 3% or more fluorine, effective defluorination of the mixtures, i.e., reduction of fluorine content to about 0.4% or less, can be effected with a calcining temperature of about 1250° C. to 1300° C. and a retention time at temperature of about 10 minutes when the material has a mole ratio in the range between about 3.0 and 3.8. Longer retention time in the calciner reduces the fluorine content further, particularly when utilizing higher temperatures short of fusion.

Alkali metal oxide/$P_2O_5$ mole ratio also has a marked effect on the citrate solubility of the $P_2O_5$ content of the products. Products of the same calculated mole ratio, for example 3.1, show markedly increased percentages of the total $P_2O_5$ which are citrate soluble when the alkali metal to $P_2O_5$ mole ratio is increased above about 0.2 to about 0.6. At an alkali metal oxide/$P_2O_5$ mole ratio of substantially zero, a mix of calculated mole ratio of 3.5 and calcined at about 1370° C. shows about 20% citrate solubility. At an alkali metal oxide/$P_2O_5$ mole ratio of 0.3, the citrate solubility after calcining is about 80% to 85%. At a ratio of 0.6 a citrate solubility in excess of about 95% is obtained. When mixtures of higher calculated mole ratio, for example, 3.5, are heat treated, amounts of added alkali giving low alkali metal to $P_2O_5$ mole ratio of the order of 0.2, show similar response to that obtained with an alkali metal mole ratio to $P_2O_5$ of 0.3 for mixtures of 3.1 calculated mole ratio.

Alkali metal salts added to the mix may be soda ash, sodium sulfate, sodium nitrate, sodium formate, sodium chloride, potassium carbonate, potassium sulfate, and the like.

Mixtures balanced to have mole ratios as above described, are heat treated in a calciner such as a rotary kiln, tunnel furnace, and the like. The calciner or calciners may be of the type where the combustion gases and the flame of the burner are directed into the product discharge end of the kiln or the heating may be of the indirect type. Regardless of the type of heat treatment equipment, the mixture during the calcination, if there is to be effective defluorination, must be in contact with a gaseous atmosphere containing water vapor. Such an atmosphere may be created by injection of either steam or water into preferably the flame end of the calciner or by the use of fuel of sufficient hydrogen content so as to produce the desired water vapor content in the combustion products or suitable combinations of these methods. Preferably, the heat treatment is carried ou in a single stage of calcination.

In this calciner, the solids are tumbled preferably at a temperature in the range between about 1250° C. and about 1450° C., usually at a temperature in the range between about 1300° C. to 1400° C. If the heat treatment is to be conducted in multiple stages, the first calcination is preferably conducted at a temperature of about 1250° C. to 1350° C. and the material partially defluorinated and then the second stage is preferably conducted at a higher temperature, i.e., at a temperature in the range between about 1300° C. and 1400° C. In a two stage operation, the heat treatment is generally conducted so that a substantial amount of fluorine is removed from the phosphate material but insufficient to render the product unsuitable as an animal feed. If this calcining operation involves agitation and tumbling, it will granulate or nodulize the product making for a free-flowing material without any fusion of the charge.

Total $P_2O_5$ content of the products was determined in accordance with the Methods of Analysis for Fertilizer, established by the Association of Official Agricultural Chemists, as shown in the 6th edition, 1945, page 21.

The orthophosphate content of products was determined as follows:

Weigh .4 gram sample into 600 ml. beaker, add 400 ml. .4% HCl[1]. Stir for 2 hours in water bath, 98–99° F.

Transfer to a 500 ml. volumetric flask, cool and make to volume. Shake to mix and filter on dry filter. Pipette two 50 ml. samples into 250 ml. beakers. Add 50 ml. of ammonium nitrate at room temperature to first sample, then place on stirring rack. While stirring, add 50 ml. of ammonium molybdate solution and stir for 40 minutes. After sample #1 has been stirring for 20 minutes, repeat above procedure on sample #2 stirring it only 20 minutes so that two samples finish stirring at same time. Filter thru asbestos pad, wash six times with distilled $H_2O$, place sample back in beaker and nitrate as for ordinary $P_2O_5$ sample.

In order to give a fuller understanding of the invention, but with no intention to be limited thereto, the following specific examples are given to illustrate the character of the invenion herein described.

*Example I*

A Florida phosphate rock of approximately 77% BPL was comminuted to a size such that all of it passed through a 100 mesh standard screen. To 100 parts by weight of this comminuted rock was added 10 parts by weight of 50.1% $P_2O_5$ phosphoric acid. The phosphate rock-phosphoric acid mixture was blended in a pug mill for approximately 3 minutes and then 27.1 parts by weight of sodium carbonate was added and pug milling continued for approximately 5 minutes to accomplish a thorough dispersion of the sodium phosphate.

This blend was calcined in a tube furnace at a temperature of approximately 1370° C. for approximately 45 minutes. The calcining was carried out in an atmosphere containing approximately 10% by volume of water vapor. The product analysis is shown in the table which sets forth comparatively the products of all the examples.

*Example II*

Fifty-eight parts by weight of phosphoric acid, prepared by the reaction of 72% BPL phosphate rock with sulfuric acid and having a $P_2O_5$ content of approximately 50.1%, was mixed with 43.2 parts by weight of sodium carbonate. The mixture was agitated and reacted for approximately 5 minutes.

The reacted mixture and 100 parts by weight of phosphate rock of 77% BPL and comminuted to a particle size such that approximately 100% passed through a 100 mesh standard screen, were thoroughly blended in a pug mill for approximately 5 minutes to produce a damp dry blend which would pass through an 80 mesh standard screen. This blend was calcined in a rotary kiln at a temperature of approximately 1370° C. for approximately 45 minutes. As in Example I, the calcining was carried out in an atmosphere containing approximately 10% by volume of water vapor. Analysis of the product is shown in the table.

*Example III*

24.5 parts by weight of phopshoric acid prepared by the reaction of 72% BPL phosphate rock with sulfuric acid and having a $P_2O_5$ content of 50.1%, was mixed with 9.1 parts by weight of sodium carbonate. The mixture was agitated and reacted for approximately 5 minutes.

The reacted mixture and 100 parts by weight of phosphate rock of 77% BPL and comminuted to a particle size such that approximately 100% passed through a 100 mesh standard screen, were thoroughly blended in a pug mill for approximately 5 minutes to produce a damp dry blend which would pass through an 80 mesh standard screen. This blend was calcined in a rotary kiln at a temperature of approximately 1370° C. for approximately 45 minutes. As in Example I, the calcining was carried out in an atmosphere containing approximately 10% by volume of water vapor. Analysis of the product is shown in the table.

---

[1] Approx. 36.3 ml. conc. HCl in 4 liters $H_2O$ ($P_2O_5$ in #2) − ($P_2O_5$ in #1 − $P_2O_5$ in #2) = Ortho $P_2O_5$.

|  | Product 1 | Product 2 | Product 3 |
|---|---|---|---|
| Total $P_2O_5$ _____ percent__ | 36.3 | 42.5 | 42.8 |
| C.I. $P_2O_5$ _____ | 2.5 | 4.0 | 9.7 |
| $Na_2O$ _____ | 11.2 | 14.22 | 3.84 |
| CaO _____ | 44.3 | 36.11 | 46.02 |
| P _____ | 15.8 | 18.5 | 18.7 |
| P/F _____ | 176 | 7100.0 | 2670 |
| F _____ | .09 | 0.0026 | .007 |
| $Al_2O_3$ _____ | 2.4 | 1.41 | 1.22 |
| $Fe_2O_3$ _____ | 1.3 | 1.50 | 1.16 |
| Calculated Mole Ratio _____ | 4.3 | 3.15 | 3.1 |
| $Na_2O/P_2O_5$ Mole Ratio _____ | 0.77 | 0.77 | 0.25 |

Comparison of the products above shows that the acid sodium phosphates give marked superiority in defluorination of other procedures heretofore standard operation.

Having thus described the invention, what is desired to be secured by Letters Patent is:

1. A process for producing an animal feed ingredient containing less than 0.1% fluorine from comminuted phosphate rock containing fluorine in an amount which renders it unsuitable for use as an animal feed ingredient which comprises admixing (a) comminuted phosphate rock,
(b) water, and
(c) sodium acid phosphate to form a water-wetted blend of solids in proportions such that for a final product the mole ratio represented by the following formula is between 3.0 and 3.8:

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the mole ratio of alkali metal oxide to $P_2O_5$ is between about 0.2:1 and 0.77:1, and calcining the mixture at a temperature higher than about 1300° C. without fusion for at least 10 minutes and recovering a defluorinated phosphate containing less than 0.1% fluorine useful as an animal feed ingredient.

2. The process of claim 1 wherein said sodium acid phosphate is prepared by reacting equimolar quantities of sodium carbonate and aqueous phosphoric acid solution.

References Cited in the file of this patent
UNITED STATES PATENTS

| 1,842,843 | Rothe et al. | Jan. 26, 1932 |
| 2,442,969 | Butt | June 8, 1948 |
| 2,556,541 | Hollingsworth | June 12, 1951 |
| 2,565,351 | Butt | Aug. 21, 1951 |
| 2,839,377 | Hollingsworth | June 17, 1958 |
| 2,893,834 | Richardson | July 7, 1959 |

UNITED STATES PATENT OFFICE
CERTIFICATE OF CORRECTION

Patent No. 3,058,804 October 16, 1962

Donald E. Tynan

It is hereby certified that error appears in the above numbered patent requiring correction and that the said Letters Patent should read as corrected below.

Column 3, line 45, for "ou" read -- out --; column 4, line 11, for "nitrate" read -- titrate --.

Signed and sealed this 9th day of April 1963.

(SEAL)
Attest:

ESTON G. JOHNSON
Attesting Officer

DAVID L. LADD
Commissioner of Patents